(12) United States Patent
Yang et al.

(10) Patent No.: US 9,403,249 B2
(45) Date of Patent: Aug. 2, 2016

(54) TURNOVER APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bo Yang, Shenzhen (CN); Bing Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 23 days.

(21) Appl. No.: 14/496,809

(22) Filed: Sep. 25, 2014

(65) Prior Publication Data
US 2015/0196984 A1 Jul. 16, 2015

(30) Foreign Application Priority Data
Jan. 14, 2014 (CN) .......................... 2014 1 0015056

(51) Int. Cl.
| | |
|---|---|
| *B23Q 1/25* | (2006.01) |
| *B23Q 3/06* | (2006.01) |
| *B23Q 1/52* | (2006.01) |
| *B23Q 5/34* | (2006.01) |

(52) U.S. Cl.
CPC .. *B23Q 3/06* (2013.01); *B23Q 1/52* (2013.01); *B23Q 5/341* (2013.01)

(58) Field of Classification Search
USPC .......................................... 269/55, 57, 61, 66
See application file for complete search history.

(56) References Cited

U.S. PATENT DOCUMENTS

| | | | |
|---|---|---|---|
| 6,725,754 B2 * | 4/2004 | MacKenzie | ............ B23Q 3/007 269/303 |
| 2014/0103592 A1 * | 4/2014 | Tayama | ............... B23Q 1/5406 269/74 |

* cited by examiner

*Primary Examiner* — Joseph J Hail
*Assistant Examiner* — Shantese McDonald
(74) *Attorney, Agent, or Firm* — ScienBiziP, P.C.

(57) ABSTRACT

A turnover apparatus is configured for flipping a workpiece. The turnover apparatus includes an rotatable frame, a cam assembly, two racks located at the two opposite sides of the cam assembly, a first clamping module and a second clamping module located at the two opposite sides of the workpiece. The rotatable frame includes a power input shaft. The cam assembly is coiled around the power input shaft, and includes an eccentric cam. Each clamping module includes a plurality of transmission assemblies and clamping assemblies. The rotatable frame can rotate around the cam assembly. At the same time, the clamping assemblies can clamp or loosen the workpiece by the driving force of the racks and the transmission assemblies.

18 Claims, 10 Drawing Sheets

TURNOVER APPARATUS

FIELD

The subject matter herein generally relates to turnover apparatuses.

BACKGROUND

When machining workpieces, an apparatus is needed to turnover the workpieces. So the workpieces can be processed conveniently by an operator.

BRIEF DESCRIPTION OF THE DRAWINGS

Implementations of the present technology will now be described, by way of example only, with reference to the attached figures.

DETAILED DESCRIPTION

Figure 1:
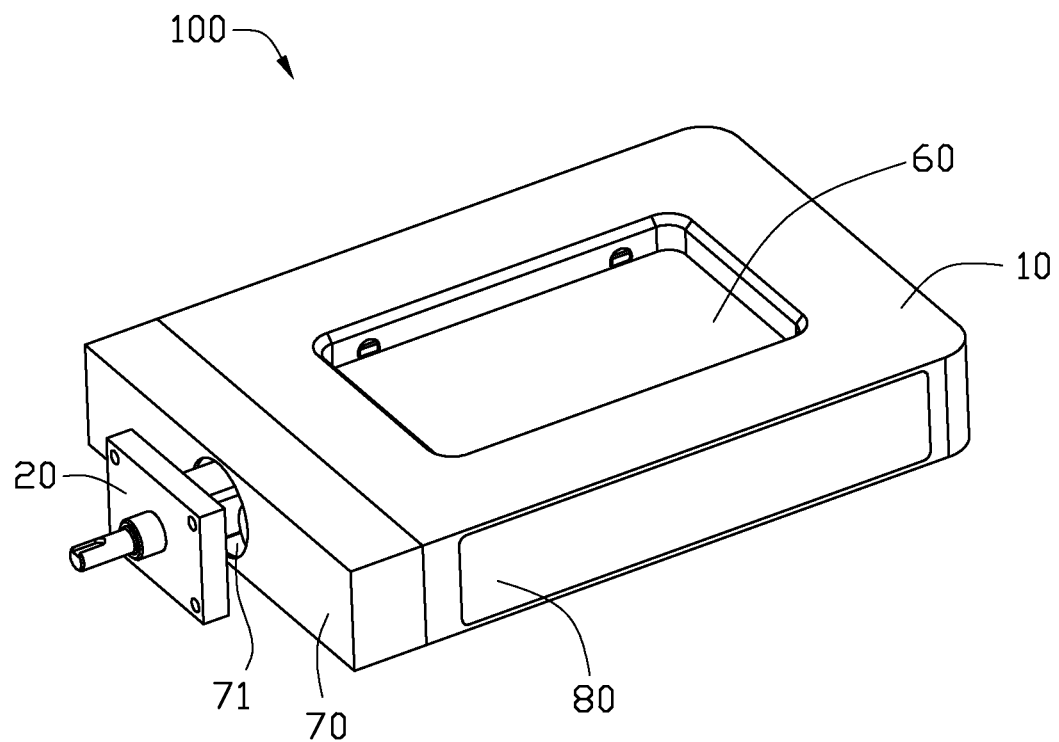
FIG. 1 is an isometric view of an embodiment of a turnover apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a turnover apparatus.

FIG. 1 illustrates an embodiment of a turnover apparatus 100 for turning over a workpiece 60. The turnover apparatus 100 can include a rotatable frame 10, a cam assembly 20, a protective casing 70, and two side panels 80. The protective casing 70 can include a mounting hole 71. The cam assembly 20 can pass through the mounting hole 71.

Figure 2:
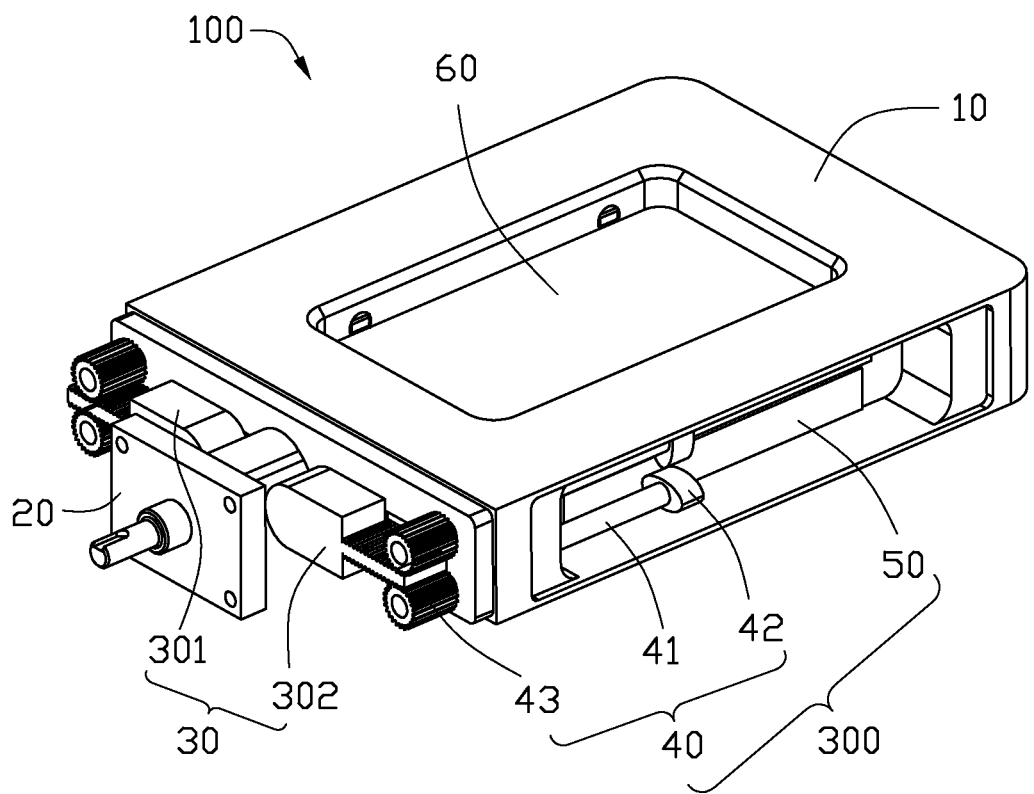
FIG. 2 is an isometric inner structural view of the turnover apparatus of FIG. 1.

FIG. 2 illustrates that the turnover apparatus 100 can further include two racks 30 located at two opposite sides of the cam assembly 20, and a clamping module 300. The two racks 30 can include a first rack 301 and a second rack 302. The clamping module 300 can include a plurality of transmission assemblies 40 and a plurality of clamping assemblies 50. Each of transmission assemblies 40 can include a transmission shaft 41, a cam 42 at one end of the transmission shaft 41, and a gear 43 at the other end of the transmission shaft 41. The cam 42 can be a unimodal cam or an axisymmetrical bimodal cam.

Figure 3:
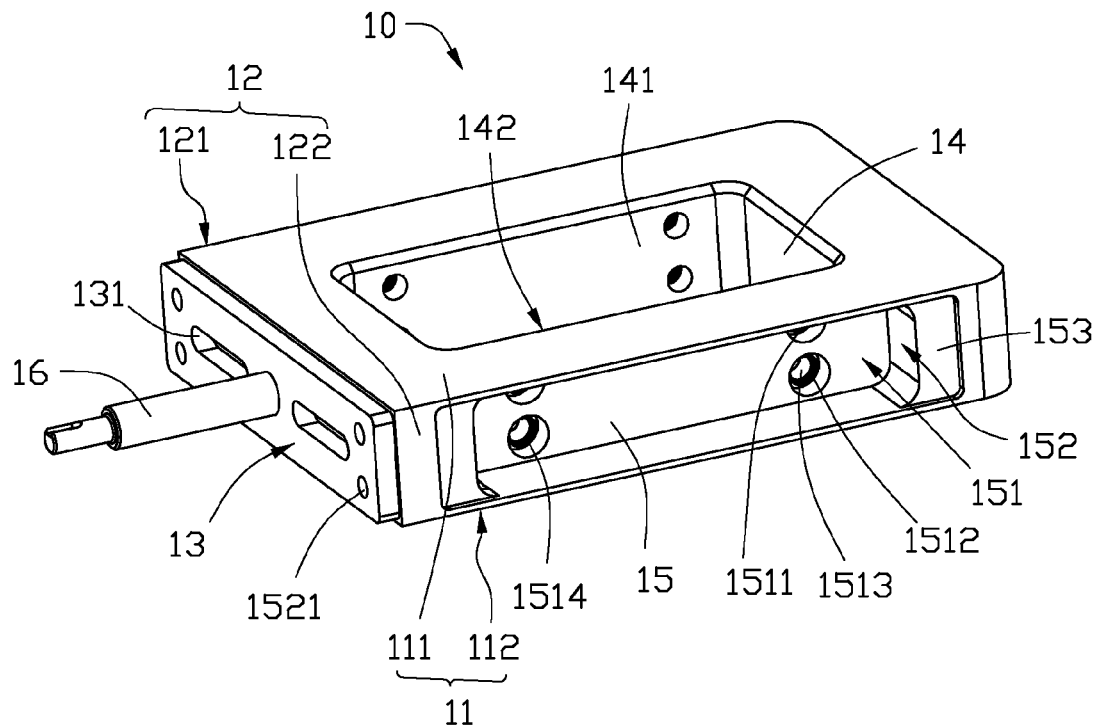
FIG. 3 is an isometric view of a rotatable frame of the turnover apparatus of FIG. 1.

FIG. 3 illustrates that the rotatable frame 10 can be a substantially rectangular plate, and can further include two opposite surfaces 11, two opposite first side-surfaces 12, and an end surface 13. The two opposite surfaces 11 can include a upper surface 111 and a lower surface 1112. The lower surface 112 opposite to, and substantially parallel to, the upper surface 111. The two opposite first side-surfaces 12 can include a first side 121 and a second side 122. The second side 122 can opposite to, and substantially parallel to, the first side 121, with two opposite first side-surfaces 12 substantially perpendicular to the two opposite surfaces 11. The rotatable frame 10 can further include a workpiece holding space 14, two receiving grooves 15 respectively defined on the two side-surfaces 12, a power input shaft 16 positioned on the end surface 13. The workpiece holding space 14 can extend from the upper frame surface 111 to the lower frame side 112. The workpiece holding space 14 can include a first inner wall 141 and a second inner wall 142, the second inner wall 142 can opposite to and substantially parallel to the first inner wall 141. And the first inner wall 141 can closer to, and substantially parallel to the first frame side 121 and the second inner wall 142 can closer to and substantially parallel to the second frame side 122. The receiving grooves 15 can be covered by the side panels 80 (shown in FIG. 1). The end surface 13 can include two sliding grooves 131. The two sliding grooves 131 can be located at two opposite sides of the power input shaft 16.

Each of the receiving grooves 15 can include a bottom surface 151, two second side-surfaces 152 parallel to the end surface 13, and a peripheral groove 153 surrounding the receiving groove 15. The bottom surface 151 can include a plurality of receiving through holes 1511. The plurality of receiving through holes 1511 can be arranged in two rows on the bottom surface 151. The receiving grooves 15 can communicate with the workpiece holding space 14 via the receiving through holes 1511. Each of the receiving through holes 1511 can be a stepped hole, and can include a first through hole portion 1512 and a second through hole portion 1513. The diameter of the first through hole portion 1512 can be larger than the diameter of the second through hole portion 1513. A plurality of springs 1514 can be respectively positioned in each of the first through holes 1512. One second side-surface 152 of each of the receiving grooves 15 can include two first through holes 1521, and the two first through holes 1521 can pass through the one second side-surface 152 and the end surface 13. Each of the first through holes 1521 can respectively correspond to one row of the receiving through holes 1511. The transmission shafts 41 (shown in FIG. 2) can be rotatably received in the first through holes 1521. The peripheral groove 153 can receive the side panel 80 (shown in FIG. 1).

Figure 4:
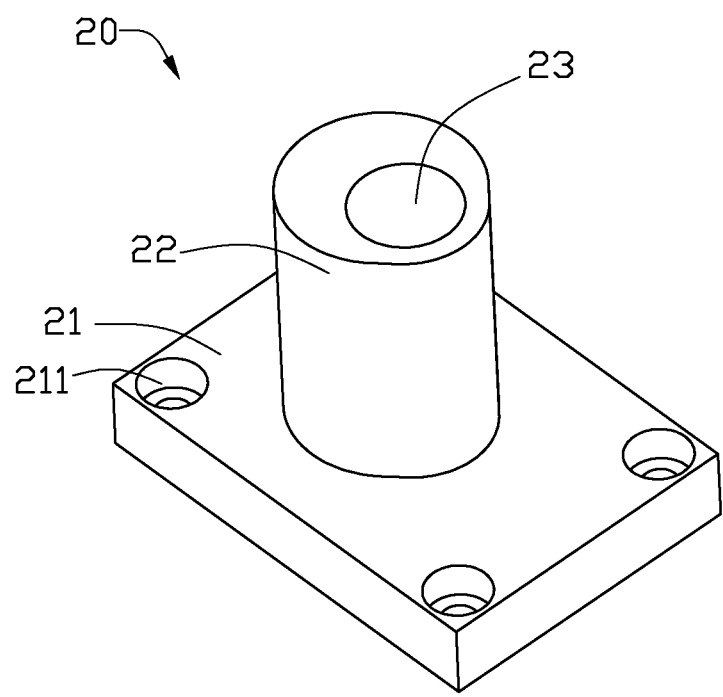
FIG. 4 is an isometric view of a cam assembly of the turnover apparatus of FIG. 1.

FIG. 4 illustrates that the cam assembly 20 can include a fastening base 21, an eccentric cam 22 positioned on the fastening base 21, and a second through hole 23 passing through the fastening base 21 and the eccentric cam 22. The fastening base 21 can include a plurality of locking holes 211 for fastening the cam assembly 20 to a machining device (not shown). The eccentric cam 22 can be magnetic. The cam assembly 20 can be placed around the power input shaft 16 (shown in FIG. 3) by the second through hole 23.

Figure 5:
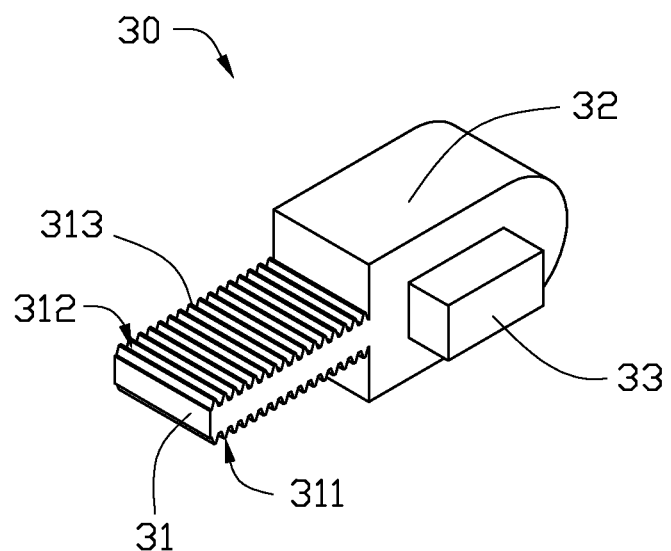
FIG. 5 is an isometric view of a rack of the turnover apparatus of FIG. 1.

FIG. 5 illustrates that each of the racks 30 can include a transmission portion 31, a flange portion 32 connected to the transmission portion 31, and a sliding block 33 positioned on one side of the flange portion 32. Each of the racks 30 can be magnetic for making sure the flange portion 32 maintains steady contact with the eccentric cam 22 (shown in FIG. 4). In addition, the flange portion 32 can always be tangent to the eccentric 22 (shown in FIG. 4) by an external mechanical force. The transmission portion 31 can include a first mating surface 311 and a second mating surface 312. The first mating surface 311 and the second mating surface 312 can include a plurality of continuous teeth 313, and can be respectively engaged with the corresponding gear 43 (shown in FIG. 2). The sliding blocks 33 can be received in the sliding grooves 131 (shown in FIG. 3).

Figure 6:
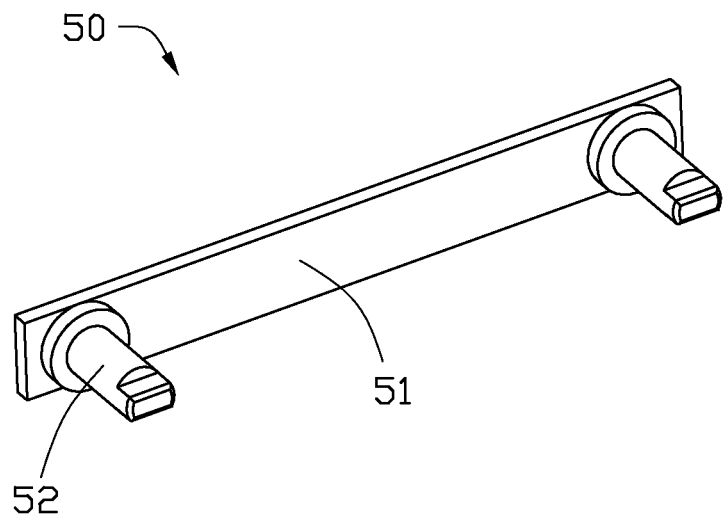
FIG. 6 is an isometric view of a clamping assembly of the turnover apparatus of FIG. 1.

FIG. 6 illustrates that each of the clamping assemblies 50 can include a fastening panel 51 and at least one clamp 52 positioned on the fastening panel 51. The fastening panel 51 can be substantially a stripe. The clamps 52 of each of the clamping assemblies 50 can correspond to and be received in the one row of the receiving through holes 1511 (shown in FIG. 3).

Figure 7:
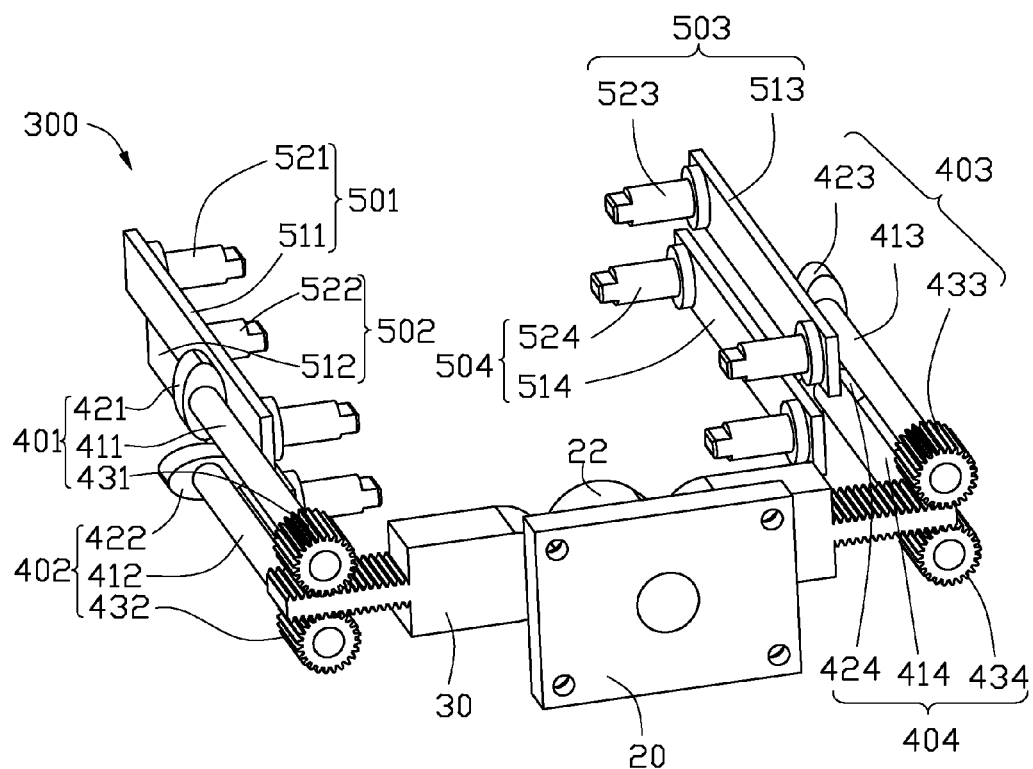
FIG. 7 is an isometric view of the cam assembly, the rack, and a clamping module of the turnover apparatus of FIG. 1 assembled together.

FIG. 7 illustrates that the transmission assembly 40 (shown in FIG. 2) can further include a first transmission assembly 401, a second transmission assembly 402, a third transmission assembly 403, and a fourth transmission assembly 404. The transmission assembly 401 and the transmission assembly 402 can be located at one side of the rotatable frame 10 (shown in FIG. 2), and the transmission assembly 403 and the transmission assembly 404 can be located at opposite sides of the rotatable frame 10 (shown in FIG. 2). The transmission assembly 401, the transmission assembly 402, the transmission assembly 403, and the transmission assembly 404 can engage with the racks 30. The first transmission assembly 401 can include a first transmission shaft 411, a first cam 421 at one end of the first transmission shaft 411, and a first gear 431 at the other end of the first transmission shaft 411. The second transmission assembly 402 can include a second transmission shaft 412, a second cam 422 at one end of the second transmission shaft 412, and a second gear 432 at the other end of the second transmission shaft 412. The third transmission assembly 403 can include a third transmission shaft 413, a third cam 423 at one end of the third transmission shaft 413, and a third gear 433 at the other end of the third transmission shaft 413. The fourth transmission assembly 404 can include a fourth transmission shaft 414, a fourth cam 424 at one end of the fourth transmission shaft 414, and a fourth gear 434 at the other end of the fourth transmission shaft 414.

The clamping assembly 50 (shown in FIG. 2) can further include a first clamping assembly 501, a second clamping assembly 502, a third clamping assembly 503, and a fourth clamping assembly 504. The first clamping assembly 501 can include a first fastening panel 511 and at least one first clamp 521 positioned on the first fastening panel 511. The second clamping assembly 502 can include a second fastening panel 512 and at least one second clamp 522 positioned on the second fastening panel 512. The third clamping assembly 503 can include a third fastening panel 513 and at least one third clamp 523 positioned on the third fastening panel 513. The fourth clamping assembly 504 can include a fourth fastening panel 514 and at least one fourth clamp 524 positioned on the fourth fastening panel 514. The first fixing plate 511, the second fixing plate 512, the third fixing plate 513, and the fourth fixing plate 514 can respectively resist against the first cam 421, the second cam 422, the third cam 423, and the fourth cam 424.

Figure 8:
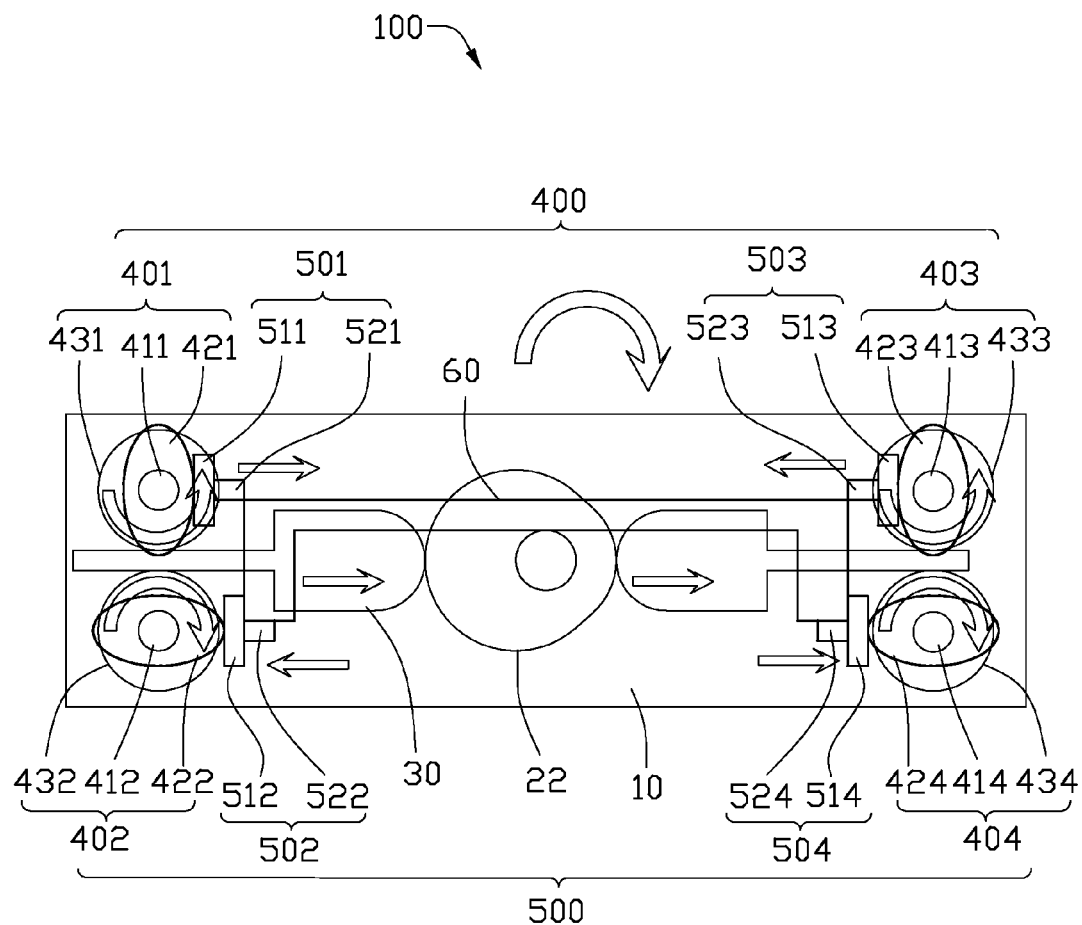
FIG. 8 is a diagrammatic view of the turnover apparatus of FIG. 1 in an original state.

FIG. 8 illustrates that a first clamping module 400 can include the first transmission assembly 401, the first clamping assembly 501, the third transmission assembly 403, and the third clamping assembly 503. A second clamping module 500 can include the second transmission assembly 402, the second clamping assembly 502, the fourth transmission assembly 404, and the fourth clamping assembly 504.

In assembly, every two clamping assemblies 50 can be positioned in one receiving groove 15 of the rotatable frame 10, and the clamps 52 of each clamping assembly 50 can be received in the receiving through holes 1511. Then the four transmission shafts 40 can be respectively positioned in the first through holes 1511 on the end surface 13. The cam 42 can be positioned on one end of each transmission shaft 40 in the receiving groove 15, and can resist against the corresponding fixing plate 51 of the clamping assembly 50. At present, the first clamp 521 and the third clamp 523 can be kept in the receiving through holes 1511, and the second clamp 522 and the fourth clamp 524 can jut out of the receiving through holes 1511. The side panel 80 can cover the receiving groove 15. After that, the gears 43 can be positioned on the other end of each transmission shaft 40 located at the end surface 13. The transmission portion 31 of the first rack 301 can engage with the first gear 431 and the second gear 432, and the transmission portion 31 of the second rack 302 can engage with the third gear 433 and the fourth gear 434. The sliding blocks 33 of the two racks 30 can be respectively positioned in the sliding grooves 131. The protective casing 70 can cover the end surface 13, and the four gears 43 and two racks 30 can be received in the protective casing 70. Finally, the cam assembly 20 can be placed around the power input shaft 16 by passing through the mounting through hole 71, and the eccentric cam 22 can be tangent to the flange portions 32 of the two racks 30. The turnover apparatus 100 can be fastened on the machining device via the fastening base 21.

FIG. 8 illustrates the turnover apparatus 100 in the original turnover state. The first clamp 521 and the third clamp 523 of the first clamping module 400 can be kept in the receiving through holes 1511 (shown in FIG. 3), and the second clamp 522 and the fourth clamp 524 of the second clamping module 500 can jut out of the receiving through holes 1511 (shown in FIG. 3). The workpiece 60 can be supported in the rotatable frame 10 by the second clamp 522 and the fourth clamp 524.

When the rotatable frame 10 is overturned clockwise, the rotatable frame 10 can rotate around the eccentric cam 22. Therefore, the two racks 30 can move to the right, and the two racks 30 can be tangent to the eccentric cam 20 by the magnetic force devolved in the turnover process.

The first gear 431 and the third gear 433 can rotate counter-clockwise from the motion of the racks 30, and the first cam 421 and the third cam 423 can rotate counter-clockwise from the rotation of the first gear 431 and the third gear 433. The first clamp 521 and the third clamp 523 can gradually jut out of the receiving through holes 1511 (shown in FIG. 3) by the resisting force of the first cam 421 and the third cam 423.

At the same time, the second cam 422 and the fourth cam 424 can rotate clockwise from the rotation of the second gear 432 and the fourth gear 434. The second clamp 522 and the fourth clamp 524 can gradually go back in the receiving through holes 1511 (shown in FIG. 3) from the resisting force of the second cam 422 and the fourth cam 424.

Figure 9:
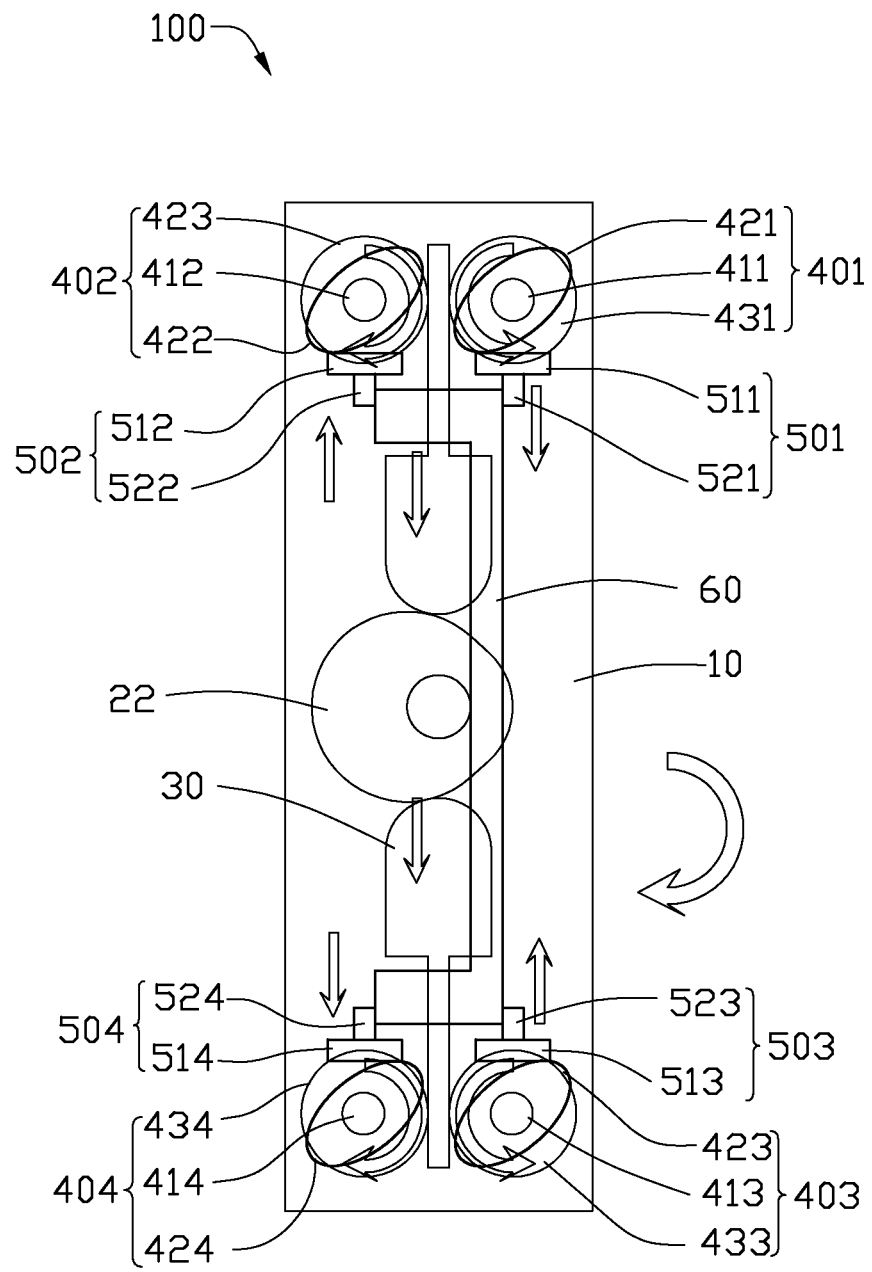
FIG. 9 is a diagrammatic view of the turnover apparatus of FIG. 1 in an intermediate flipped state.

FIG. 9 illustrates the turnover apparatus 100 in the intermediate turnover state. When the rotatable frame 10 rotates 90 degrees, a part of the first clamp 521, the second clamp 522, the third clamp 523, and the fourth clamp 524 can jut out of the receiving through holes 1511 (shown in FIG. 3) to clamp the workpiece 60. The workpiece 60 can not deviate from the rotatable frame 10.

Figure 10:
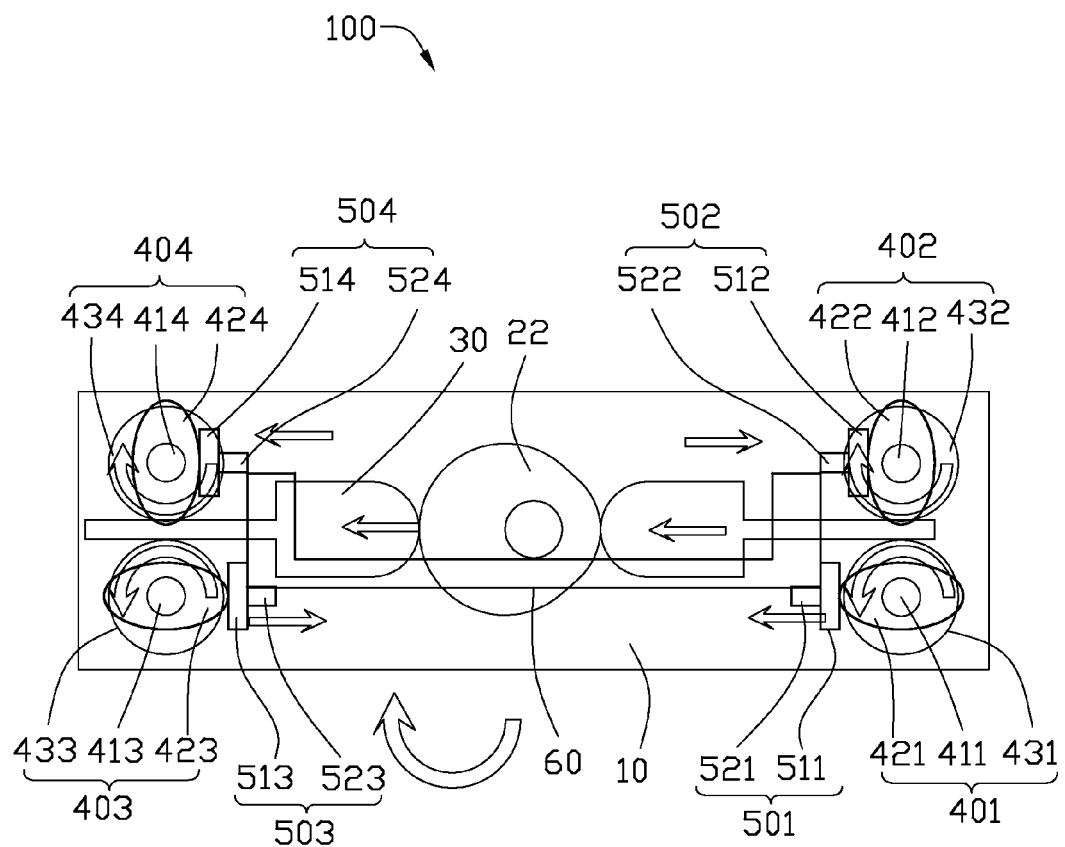
FIG. 10 is a diagrammatic view of the turnover apparatus of FIG. 1 in a completely flipped state.

FIG. 10 illustrates the turnover apparatus 100 in the completely flipped state. When the rotatable frame 10 rotates 180 degrees, the first clamp 521 and the third clamp 523 can completely jut out of the receiving through holes 1511 (shown in FIG. 3) to support the workpiece 60. The second clamp 522 and the fourth clamp 524 can go completely back in the receiving through holes 1511 (shown in FIG. 3) for comfortable machining or examining of the workpiece 60.

In the other embodiments, a transmission assembly of the first clamping module and the second clamping module can be an integral structure or a plurality of assemblies, and can not interfere with the transmission assemblies ability to resist against and drive a plurality of clamping assemblies to clamp and release a workpiece. A clamping assembly of the first clamping module and the second clamping module can be an integral structure or a plurality of assemblies, and can not interfere with the clamping assemblies clamping and loosening of a workpiece.

As described above, the rotatable frame 10 can drive the workpiece 60 to flip. At the same time, the clamping assemblies 50 can clamp and loosen the workpiece 60 by the driving force of the cam assembly 20, the racks 30 and the transmission assemblies 40 for the subsequent processes. In addition, the turnover apparatus 100 needs only one power source and is cheap.

The embodiments shown and described above are only examples. Many details are often found in the art such as the other features of a turnover apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A turnover apparatus configured for turnover a workpiece, the turnover apparatus comprising:
    an rotatable frame;
    a cam assembly;
    two racks;
    a first clamping module; and
    a second clamping module;
    wherein the rotatable frame includes a power input shaft; the cam assembly is coiled around the power input shaft, and includes an eccentric cam;
    wherein the two racks located at two opposite sides of the cam assembly, and each of the racks includes a transmission portion and a flange portion connected to the transmission portion; the transmission portion includes a first mating surface and a second mating surface opposite to the first mating surface; the flange portion is always tangent to the eccentric cam;
    wherein the first clamping module and the second clamping module located at two opposite sides of the workpiece, and include a plurality of transmission assemblies and clamping assemblies; the transmission assemblies of the first clamping module are engaged with the first mating surface of each of the two racks; the transmission assemblies of the second clamping module are engaged with the second mating surface of each of the two racks; the transmission assemblies resist against the clamping assemblies to drive the clamping assemblies for clamping or loosening the workpiece.

2. The turnover apparatus as claimed in claim 1, wherein the rotatable frame further includes two opposite surfaces, two opposite first side-surfaces, an end surface, a workpiece holding space passing through the two opposite surfaces, and two receiving grooves respectively defined on the two opposite first side-surfaces.

3. The turnover apparatus as claimed in claim 2, wherein the power input shaft is positioned on the end surface, and the end surface includes two sliding grooves located at two opposite sides of the power input shaft.

4. The turnover apparatus as claimed in claim 2, wherein each of the two receiving grooves includes a bottom surface, a plurality of receiving through holes positioned on a bottom surface, two second side-surfaces parallel to the end surface; the one of the two second side-surfaces includes two first through holes passing through the one second side-surface and the end surface.

5. The turnover apparatus as claimed in claim 4, wherein the receiving through holes are arranged in two rows on the bottom surface; each of the two first through holes can respectively correspond to one row of the receiving through holes.

6. The turnover apparatus as claimed in claim 4, wherein each of the transmission assemblies includes a transmission shaft, a cam at one end of the transmission shaft, and a gear at the other end of the transmission shaft; the transmission shafts are rotatably receiving in the first through holes; the gears are engaged with the transmission portions.

7. The turnover apparatus as claimed in claim 6, wherein each of the clamping assemblies includes a fastening panel and at least one clamp positioned on the fastening panel; each of the fastening panels resists against each of the cams; the clamps are respectively received in the receiving through holes.

8. The turnover apparatus as claimed in claim 4, wherein each of the receiving through holes is a stepped hole, and includes a first through hole portion and a second through hole portion.

9. The turnover apparatus as claimed in claim 8, wherein the diameter of the first through hole portion is larger than the diameter of the second through hole portion.

10. The turnover apparatus as claimed in claim 8, wherein each of the first through holes receives a spring.

11. The turnover apparatus as claimed in claim 3, wherein each of the two racks further includes a sliding block, and the sliding block is received in the corresponding the sliding groove.

12. The turnover apparatus as claimed in claim 2, wherein the workpiece is received in the workpiece holding space.

13. The turnover apparatus as claimed in claim 2, wherein the turnover apparatus further includes two side panels, and the two side panels respectively cover the two receiving grooves.

14. The turnover apparatus as claimed in claim 2, wherein the turnover apparatus further includes a protective casing, and the protective casing cover the end surface.

15. The turnover apparatus as claimed in claim 1, wherein the cam assembly further includes a fastening base and a second through hole passing through the fastening base and the eccentric cam; the eccentric cam is positioned on the fastening base.

16. The turnover apparatus as claimed in claim 1, wherein the eccentric cam and the two racks are magnetic.

17. A rotatable work piece holder comprising:
   a rotatable frame having:
      a upper surface;
      a lower surface, the lower surface opposite to, and substantially parallel to, the upper surface;
      a first side;
      a second side opposite to, and substantially parallel to, the first side, with the first and second sides substantially perpendicular to the upper and lower surfaces; and
      a end surface, substantially perpendicular to the upper and lower surfaces and the first and second sides;
         wherein, a workpiece holding space extends from the upper surface to the lower surface, the workpiece holding space having a first inner wall and a second inner wall, the second inner wall opposite to and substantially parallel to the first inner wall and the first inner wall closer to, and substantially parallel to the first side and the second inner wall closer to and substantially parallel to the second side;
      a power input shaft coupled to the end surface of the rotatable frame; and
      a clamping assembly having;
         at least one first clamp movably extending into the workpiece holding space from the first inner wall and positioned near the upper surface;
         at least one second clamp movably extending into the workpiece holding space from the first inner wall and positioned near the lower surface;
         at least one third clamp movably extending into the workpiece holding space from the second inner wall and positioned near the upper surface; and
         at least one fourth clamp movably extending into the workpiece holding space from the second inner wall and positioned near the lower surface;
      wherein, the power input shaft can rotate the rotatable frame from a first frame position to a second frame position;
      wherein, in the first frame position, the at least one first clamp and the at least third clamp do not extend into the workpiece holding space, the at least one second clamp and the at least fourth clamp extend into the workpiece holding space;
      wherein, in the second frame position, the at least one first clamp and the at least third clamp extend into the workpiece holding space, the at least one second clamp and the at least fourth clamp do not extend into the workpiece holding space; and
      wherein, when the rotatable frame is rotating from the first frame position to the second frame position, the at least one first clamp, the at least one second clamp, the at least third clamp and the at least fourth clamp all extend into the workpiece holding space.

18. The rotatable work piece holder of claim 17, further comprising:
   an eccentric cam coupled around and rotatable by the power input shaft;
   a first rack positioned along, and slidably engaged with, the end surface of the rotatable frame;
   a second rack positioned along, and slidably engaged with, the end surface of the rotatable frame;
   a first transmission assembly engaged with the first rack to drive the at least one first clamp;
   a second transmission assembly engaged with the first rack to drive the at least one second clamp;
   a third transmission assembly engaged with the second rack to drive the at least one third clamp; and
   a fourth transmission assembly engaged with the second rack to drive the at least one fourth clamp;
   wherein, the first rack is positioned between the eccentric cam and the first side and movable by rotation of the cam, and the second rack is positioned between the eccentric cam and the second side and movable by rotation of the cam.

* * * * *